United States Patent Office 2,758,929
Patented Aug. 14, 1956

2,758,929

METHOD OF PRESERVING SHRIMP

Harry A. Toulmin, Jr., Dayton, Ohio, assignor to The Commonwealth Engineering Company of Ohio, Dayton, Ohio No Drawing. Application April 9, 1953, Serial No. 347,847

3 Claims. (Cl. 99—158)

This invention relates to the art of preserving unpeeled shrimp during transportation thereof. More particularly, it relates to the preservation of freshly netted shrimp during transportation thereof from the fishing grounds to the packing plant.

It is known that freshly netted shrimp soon die after removal from their natural environment and begin to deteriorate soon after they are captured, and that the deterioration progresses at a rapid rate. This rapid onset and progress of deterioration may be attributed to oxidative changes and to the deleterious effects of certain oceanic and saprophytic bacteria which exist in ocean water, are invariably found in the slimy coating enveloping shrimp, in the mouths of the shrimp and on their shells. While the deterioration may be and generally is accompanied by the appearance of unslightly brown spots and blotches on the shrimp, there is no reliable method available by which the extent of deterioration can be determined before the shrimp are peeled. Since it is often the practice, in preparing the shrimp for packing, to cook them in the shell, the possibility exists for shrimp which have deteriorated in transit to the packing plant to the extent that they must be discarded to be dumped into the cooking vessel with healthy shrimp and thus for the water in which the shrimp are cooked to be progressively contaminated by drainage from the contaminated shrimp.

Many proposals have been advanced looking to improvements in handling shrimp during transportation. The most widely practiced method involves storing the freshly netted shrimp in sodium chloride solution. While the use of brine as a storage liquid may serve to retard the rate at which the deterioration sets in and proceeds, it does not entirely eliminate the problem, and shrimp which have been placed in brine soon after being caught often arrive at the packing plant in spotted condition.

It is a primary object of this invention to provide a new, improved method of preserving unpeeled shrimp during transportation thereof.

An additional object is to provide an improved method of storing shrimp by which the deleterious effect of transportation from the fishing grounds to a packing plant or the like.

Another object is to provide a method of preserving unpeeled shrimp whereby deterioration of the shrimp is inhibited regardless of delays between capture of the shrimp and preparation thereof for packing.

A further object of the invention is to provide a method of storing shirmp by which the deleterious effect of oceanic bacteria carried by the shrimp when they are netted is inhibited or retarded during transportation thus insuring that the shrimp reach their destination in peak condition.

Still another object of the invention is to minimize or eliminate the factors which normally lower the quality of unpeeled shrimp in transit.

In accordance with this invention, these and other objects are accomplished by storing the freshly netted, unpeeled shrimp in an aqueous dispersion, which term includes aqueous solutions, of a water-dispersible, including water-soluble, dextran.

The dextrans are high molecular weight polysaccharides made up of anhydroglucopyranosidic groups or units linked together by molecular structural repeating linkages some of which are alpha-1,6 linkages and some of which are alpha-non-1,6 linkages and, apparently, at least 50% of the linkages being of the alpha-1,6 type. The properties of the dextrans, including the molecular structural repeating alpha-1,6 to alpha-non-1,6 linkages ratios, the molecular weight, the water sensitivity, and the osmotic pressure in liquids may vary. The dextrans used in practicing this invention are soluble or dispersible in water or aqueous media.

The dextrans may be produced bacterially, for example by inoculating a nutrient medium containing sucrose, particular nitrogenous compounds and certain inorganic salts, with an appropriate microorganism such as those of the *Leuconostoc mesenteroides* and *L. dextranicum* types and incubating the culture at the temperature most favorable to the growth of the particular microorganism. The dextrans thus obtained usually have a high molecular weight, calculated to be in the millions and may be soluble in water or insoluble therein but dispersible in aqueous media.

In one method of obtaining a dextran for use in this invention, there is first prepared an aqueous nutrient medium which may have the following composition:

| | Per cent by weight |
|---|---|
| Sucrose | 20 |
| Corn steep liquor | 2 |
| Monobasic potassium phosphate | 0.5 |
| Manganous sulfate | 0.002 |
| Sodium chloride | 0.50 |
| Water | Balance |

This medium is adjusted to a pH of between about 6.5 and about 7.5, preferably 7.2, and then sterilized. The material is cooled to room temperature and inoculated with a culture of the dextran-producing bacteria, for example, *Leuconostoc mesenteroides* B-512 (Northern Regional Research Laboratory classification) and incubated at 20° to 30° C. (optimum 25° C.) until a maximum yield of dextran has been attained; normally a period of between 12 and 48 hours will be satisfactory for this procedure. The fermented product contains approximately 80–85% of water and is a thick turbid liquid.

Upon completion of the fermentation, which process renders the material somewhat acid, that is, to a pH of 3.5–5.5 (average 4.2), calcium chloride is added to the fermentate to bring the pH thereof to about 7.0 to 8.0. This aids in the precipitation of phosphates. Thereafter, acetone or alcohol, which may be a water-miscible aliphatic, such as methyl, ethyl or isopropyl, is added in sufficient quantity to precipitate the dextran and this brings down, with the dextran, occluded and adsorbed bacteria, and nitrogenous and inorganic elements. To occasion complete precipitation of the dextran it may be desirable to allow the mix to stand for a relatively long period, such as about 6 hours. The precipitated dextran may be dried in any suitable manner, for example by drum drying. Thereafter, it may be reduced to particulate condition which is the preferred form in carrying out the reaction with the carboxymethylating agent.

A purer dextran may be obtained by adding an aliphatic alcohol to the fermented culture at a pH between about 2.5 and 4.5. The precipitate thus obtained may be further purified by again precipitating it with the alcohol. Several precipitations may be performed.

The dextran thus produced is a so-called "native" dextran having a high molecular weight and being, in the particular case, soluble in water at ordinary temperatures.

Such a "native" high molecular weight dextran may be used in practicing the present invention, by dissolving or dispersing the same in water or aqueous medium, to obtain a medium in which the freshly netted shrimp are stored.

In the alternative, a dextran having, initially, a high molecular weight, may be hydrolyzed in any suitable manner, as by means of acid or enzymatically, to a product of lower molecular weight and the hydrolyzed dextran may be used in preparing the storing solution for the shrimp. For instance, the "native" dextran obtained as described above may by hydrolyzed to a product having a lower molecular weight or average molecular weight, for instance an average molecular weight in the range between 20,000 and 200,000 and this product may, if desired, be fractionated to obtain a fraction of pre-selected uniform or more nearly uniform molecular weight in the stated range. The fraction of pre-selected molecular weight may, if desired, be treated by known methods for the removal of pyrogens and coloring materials. The dextran used in preparing the treating medium may be a so-called "clinical" dextran.

The dextran may be obtained by inoculating the culture medium with microorganisms other than *Leuconostoc mesenteroides* B–512. Thus, it may be, for instance, a water-soluble dextran obtained by inoculating the nutrient medium with any one of the microorganisms bearing the following NRRL classifications: *Leuconostoc mesenteroides* B–119, B–1146, B–1190; or it may be a water-insoluble or substantially a water-insoluble dextran obtained by inoculating the nutrient medium with the microorganisms *Leuconostoc mesenteroides* B–742, B–1191, B–1196, B–1208, B–1216, B–1120, B–1144, or B–523, *Streptobacterium dextranicum* B–1254, or *Betabacterium vermiforme* B–1139, and which is dispersible in water or aqueous medium.

The invention is not predicated on or limited to the use of a dextran prepared under any particular set of conditions or using any particular microorganism. It may be produced enzymatically, in the substantial absence of bacteria, by cultivating an appropriate microorganism, for example, *Leuconostoc mesenteroides* B–512 to obtain a dextran-producing enzyme, separating the enzyme from the medium in which it is produced, and introducing the enzyme into a medium in which dextran is produced by the action of the enzyme. Also, the dextran may be obtained by bacterial conversion of 1,4 linkages of dextrin to 1,6 linkages of dextran.

In a presently preferred embodiment of the invention, the dextran is used as initially obtained and after suitable purification to remove occluded and absorbed bacteria and/or nitrogeneous and inorganic matter. Also, in general, the water-soluble dextrans are preferred.

The concentration of dextran in the aqueous storing medium may vary, and may be between 0.5% and 30% by weight. In general, concentrations of between 1.0% and 10% by weight are satisfactory.

It is desirable to store the shrimp in the dextran solution or dispersion as soon as possible after their capture and therefore the dextran-containing medium may be provided in storage tanks carried by the shrimp boats and into which the nets are emptied directly after their withdrawal from the ocean, and with or without prior hosing of the net contents to wash out oceanic debris and remove at least some of the slime-carrying bacteria, or the shrimp may be placed in the storing medium at the unloading sheds.

The dextran forms an over-all glaze or film over the surface of the shrimp and this glaze functions to preserve the shrimp by preventing dehydration, oxidative changes and by retarding bacterial growth and multiplication. In any event, shrimp which have been stored in the dextran medium during transportation to the packing plant reach their destination in a fresh condition, and free from objectionable brown spots or blemishes. At the packing plant, the shrimp may be removed from the storing medium, sorted or graded, subjected to various treatments, which may include a precooking, and then packed, the processing being performed with or without peeling of the shrimp. If delays occur in the handling of the shrimp after they reach the packing plant this is not detrimental even if the shrimp are removed from the medium and exposed to the prevailing atmospheric conditions since the dextran film carried by the shrimp dries and sets, forming a hard, protective over-all coating which protects the shrimp from any appreciable deterioration for long periods of time. The dextran glaze or film is removed when the shrimp are washed, and if they are cooked in the shell is dissolved or sloughed off during the cooking operation.

If the shrimp are to be shipped to market in the shell, and the protective dextran coating carried thereby on removal of the shrimp from the medium in which they are transported to the packing plant is removed during processing incidental to preparation for packing, the shrimp may be again treated with an aqueous solution or dispersion of dextran to provide them with a protective dextran coating in transit between the packing plant and the market. For example, the heads of the shrimp may be cut off, leaving intact their tails, shells and intestines or "veins," and the shrimp thus processed may be frozen or packed in ice for shipment to the market for sale to the eventual consumer in the unpeeled condition. In such a method, the butchered shrimp may be treated with an aqueous solution or dispersion of a dextran having a concentration as stated herein, and dried in air prior to being frozen or packed in ice. The coating may be applied to the shrimp in any suitable manner, as by dipping, brushing, spraying, or by placing the shrimp on a continuous reticulated conveyor which travels through the dextran-containing medium. Such a coating applied to the beheaded but unpeeled shrimp assists in preserving the freshness and flavor of the meat.

Although the invention has been discussed in detail in terms of one preferred embodiment in which the essential preservative is dextran per se, various water-soluble or water-dispersible conversion products of dextran may be used, including carboxyalkyl and particularly carboxymethyl, dextrans, dextran alkyl or aryl ethers, dextran esters, and dextran ether esters, as well as alkali metal and alkaline earth metal substitution products of dextran such as the water-soluble or water-dispersible calcium substitution products. Carboxymethyl dextrans containing an average of from less than 1 to 3.0 carboxymethyl groups per anhydroglucopyranosidic units, may be used and may be water-soluble or water-dispersible depending on the degree of substitution and the starting dextran.

Other variations and modifications may be made in practicing the invention. For example, the dextran-containing medium in which the freshly netted shrimp are stored may also comprise other substances which exert a preservative effect and are compatible with the dextran. For example, the storing solution may be a saline solution containing the dextran or a dextran conversion product. Since all such modifications and variations may be made without departing from the spirit and scope of the invention, it is to be understood that the invention is not to be limited except as defined in the appended claims.

I claim:

1. A method for inhibiting deterioration and discoloration of freshly netted, unpeeled shrimp by oxidative changes and the deleterious action of oceanic and saprophytic bacteria, which comprises contacting the shrimp with with an aqueous medium consisting essentially of an 0.5% to 30% aqueous dispersion of water-dispersible dextran, said dextran having a molecular weight between 20,000 and that of the native, unhydrolyzed dextran.

2. A method for inhibiting deterioration and discoloration of freshly netted, unpeeled shrimp by oxidative changes and the deleterious action of oceanic and saprophytic bacteria, which comprises contacting the shrimp with an aqueous medium consisting essentially of an 0.5% to 30% aqueous dispersion of water-dispersible native, unhydrolyzed dextran.

3. A method for inhibiting deterioration and discoloration of freshly netted, unpeeled shrimp by oxidative changes and the deleterious action of oceanic and saprophytic bacteria, which comprises contacting the shrimp with an aqueous medium consisting essentially of a 1.0% to 10% aqueous dispersion of water-dispersible native, unhydrolyzed dextran.

References Cited in the file of this patent

UNITED STATES PATENTS

| Number | Name | Date |
|---|---|---|
| 2,089,217 | Mahoney | Aug. 10, 1937 |
| 2,203,705 | Stahly et al. | June 11, 1940 |
| 2,229,941 | Stahly et al. | Jan. 28, 1941 |
| 2,337,645 | Cadwell | Dec. 28, 1943 |
| 2,470,281 | Allingham | May 17, 1949 |
| 2,488,184 | Garnatz et al. | Nov. 15, 1949 |
| 2,518,135 | Gaver | Aug. 8, 1950 |
| 2,567,085 | Stoloff | Sept. 4, 1951 |
| 2,600,627 | Envoldsen | June 17, 1952 |
| 2,622,034 | Wills | Dec. 16, 1952 |
| 2,627,466 | Lewis | Feb. 3, 1953 |
| 2,669,520 | Fellers | Feb. 16, 1954 |

FOREIGN PATENTS

| 15,790 | Great Britain | of 1903 |